United States Patent
Nashiki

(10) Patent No.: US 11,283,314 B2
(45) Date of Patent: Mar. 22, 2022

(54) MOTOR

(71) Applicant: Masayuki Nashiki, Aichi-ken (JP)

(72) Inventor: Masayuki Nashiki, Aichi-ken (JP)

( * ) Notice: Subject to any disclaimer, the term of this patent is extended or adjusted under 35 U.S.C. 154(b) by 75 days.

(21) Appl. No.: 16/168,887

(22) Filed: Oct. 24, 2018

(65) Prior Publication Data

US 2019/0296594 A1    Sep. 26, 2019

Related U.S. Application Data

(63) Continuation-in-part of application No. PCT/JP2017/016026, filed on Apr. 21, 2017.

(30) Foreign Application Priority Data

Apr. 25, 2016 (JP) .............................. JP2016-086704

(51) Int. Cl.
*H02K 1/27* (2006.01)
*H02K 1/276* (2022.01)
*H02K 21/16* (2006.01)

(52) U.S. Cl.
CPC ............. *H02K 1/276* (2013.01); *H02K 1/27* (2013.01); *H02K 21/16* (2013.01); *Y02T 10/64* (2013.01)

(58) Field of Classification Search
CPC ....................................... H02K 1/276–1/2766
See application file for complete search history.

(56) References Cited

FOREIGN PATENT DOCUMENTS

| | | |
|---|---|---|
| JP | 05-236684 | 9/1993 |
| JP | 2000-152538 | 5/2000 |
| JP | 2007-068318 | 3/2007 |
| JP | 2012-178922 | 9/2012 |
| WO | 2017/188143 | 11/2017 |

*Primary Examiner* — Ramon M Barrera
(74) *Attorney, Agent, or Firm* — Clark & Brody LP

(57) ABSTRACT

A motor is provided, which has a larger torque and a high power factor in lower rotation speeds and a high power factor and a field weakened characteristic in a higher rotation speed range. The motor is provided with a long-hole shaped slit arranged between a rotor magnetic pole and a further rotor magnetic pole located adjacently to the rotor magnetic pole in a circumferential direction, a permanent magnet arranged in the slit, and a non-magnetic member arranged closely to the permanent magnet in a direction of magnetic fluxes. For large torque, this configuration reduces variations in rotor field magnetic fluxes, due to torque current components. In the rotation speeds, magnetic fluxes from the permanent magnet is suppressed from causing excessive field magnetic fluxes, which balances larger torque with higher power factors and a field weakened characteristic with higher power factors.

7 Claims, 8 Drawing Sheets

MOTOR

CROSS-REFERENCE TO RELATED APPLICATIONS

This application is based on and claims the benefit of priority from earlier PCT international application number PCT/JP2017/016026 filed on Apr. 21, 2017, which is also based on Japanese Patent Application No. 2016-086704 filed on Apr. 25, 2016, the descriptions of which are incorporated herein by reference.

BACKGROUND

Technical Field

The present disclosure relates to electric motors for main machines, industrial motors, and driving techniques therefor, and particularly, relates to providing a motor system with higher efficiency, downsized structure, and/or lowered-cost production.

Related Art

Interior Permanent Magnet motors are used as motors serving as main machines for hybrid vehicles and industrial motors. It is estimated that when electric vehicles become common more widely in the future, needs for providing main-machine motors with higher performance, more downsizing, and lower cost will be asked more. Concerning an inverter for driving the motor, it is also possible to reduce a current capacity, the size, and production cost by improving the power factor of the motor.

FIG. 14 is a sectional view exemplifying a rotor of a four-pole interior permanent magnet type of motor. In this configuration, a reference number 141 indicates a rotor and a reference number 142 indicates a rotor shaft. Permanent magnets 143, 144, 145 and 146 are implemented to have N and S magnetic-pole directions as shown therein. On both ends of each permanent magnet, empty spaces (or spaces) 147 and 148 are formed, which are also referred to as flux barriers 147, so that magnetic resistance to magnetic flux passing across the flux barriers can be made larger. In FIG. 14, d-axis and q-axis are additionally shown for explaining directions of field magnetic fluxes.

The motor shown in FIG. 14 has characteristics of not only generating torque at a higher efficiency but also variably changing the amplitudes of field magnetic fluxes in the rotor poles by controlling currents to a stator. Specifically, so as to allow the motor to rotate at a higher speed, the amplitudes of the field magnetic fluxes can be reduced in a higher rotation speed range. However, the field magnetic fluxes have a limitation in a changeable range of the field magnetic fluxes.

An electric vehicle is provided with a main-machine motor which requires rotation speed vs. torque characteristics in both lower rotation speeds and higher rotation speeds. At lower rotation speeds, which are needed when the vehicle climbs a steep slope, larger torque and higher power factors are required for the climbing drive. Meanwhile, at higher rotation speeds, a field weakening characteristic is required.

A conventional electric motor with the rotor shown in FIG. 14 is able to output middle-range torque to the load efficiently. However, this conventional electric motor has been confronted with a difficulty that the power factor is reduced, in a case where a larger amount of torque, which is more than three times the constant rating torque, is required for claiming a steep slope, and is required to output larger amounts of stator currents which generate larger armature reaction. A reduction in the power factor results in larger current amplitudes, due to generation which is proportional to the inverse of the power factor, and an amount of copper loss increases, due to generation which is proportional to the square of current amplitudes Additionally, in the range of higher rotation speeds, it is necessary to weaken the field magnetic fluxes in order to limit the motor voltage. This results in supplying field weakening current components, but such field weakening current components increase the copper loss.

Any of the foregoing issues result in raising heat generated from the motor, thus tending to an increase of size of the motor to suppress influence of the generated heat. For instance, for both higher amounts of torque and higher power factors, it can be considered to increase performance of the permanent factors 143, 144, 145 and 146. However, this countermeasure can improve the torque characteristic, but the field weakening characteristic cannot be avoided from being deteriorated. In this way, the higher torque and power factor and the field weakening characteristic in the range of higher rotation speeds becomes conflicting to each other, and it is thus difficult to provide higher levels of both factors at the same time.

FIG. 15 shows a sectional view of the rotor of another four-pole an interior permanent magnet type of motor. In this figure, reference numbers 151 and 152 show permanent magnets and a d-axis and a q-axis are shown. Moreover, reference numbers 153, 154 and 155 show multi-layer flux barriers and are composed of empty spaces. These flux barriers increase magnetic resistance in the q-axis direction. Among such flux barriers, small magnetic paths MMP directed in the d-axis are provided in a multi-layered form, thereby decreasing the magnetic resistance in the d-axis direction. The permanent magnet 151 and the flux barriers 154 are not closely located to each other. Similarly, the permanent magnet 152 and the flux barriers 155 are not closely located to each other.

The flux barriers 154 and 155 suppress magnetic fluxes from being generated by the permanent magnets 151 and 152 in the q-axis direction. However, since small magnetic paths directed in the d-axis direction between two of the flux barriers occupy most of the magnetic paths of the rotor magnetic poles, magnetic fluxes generated by the permanent magnets 151 and 152 pass the foregoing small magnetic paths MMP to reach a stator portion which exists in the d-axis direction. That is, an effect of suppressing the local magnetic flows in the d-axis direction is low. The reason is that there is no close structure between the permanent magnet and the multi-layer flux barriers. In addition, there is another drawback that the local magnetic fluxes have larger torque ripples, due to the fact that the local magnetic flux has a distribution which is not a sinusoidal-wave cycle of an electric angle of 360 degrees and contains more harmonic components.

CITATION LIST

Patent Literature

[PTL 1] JP H 05-236684 (FIG. 1)
[PTL 2] JP-A 2000-152538 (FIG. 1)

SUMMARY

A rotation speed vs. torque characteristic of a main-machine motor for electric vehicles requires two issues: one is a combination of a larger torque in lower rotation speeds and a higher power factor which are required when the vehicle climbs a steep slope road, the other is to gain a constant output characteristic by field weakening control in a higher rotation speed range. The present invention is directed to satisfy the two mutually-conflicting characteristics, make the motor and inverter more compact in size, and allow such motor and inverter to be manufactured in lower cost.

Solution to the Problems

The present invention according to claim 1 provides a motor provided with a permanent magnet, comprising: a long-hole shaped slit arranged between a rotor magnetic pole and a further rotor magnetic pole located adjacently to the rotor magnetic pole in a circumferential direction; a permanent magnet MG1 arranged in the slit; and a non-magnetic member NMP1 arranged closely in a direction of magnetic fluxes from the permanent magnet MG1, wherein the non-magnetic member NMP contained in each of the rotor magnetic poles has a thickness sum which is larger than a smallest length of an air gap provided between a stator and a rotor.

The present configuration makes it possible to provide a larger torque and a higher power factor to the motor and a field weakening characteristic which can be provided by reduced current. Namely, the foregoing two mutually-conflicting characteristics can be satisfied at the same time.

In the invention of claim 2 which is dependent on claim 1, the motor includes a flux barrier portion FB2 which arranges a permanent magnet MG2 in the slit or a flux barrier portion FB3 which arranges a non-magnetic member NMP2 in the slit.

With this configuration, the mutually-conflicting relationship between a larger torque with a higher power factor and a field weakening characteristic can be overcome. In addition to this advantage, the permanent magnet and the non-magnetic member can be arranged positionally effectively, so that it is possible to provide the motor with a higher motor characteristic.

In the invention of claim 3 which is dependent on claim 1, the slit is composed a plurality of slots, the motor comprises flux barrier portions FBN which arrange the permanent magnet MG1 and the non-magnetic member NMP1 in the rotor magnetic poles, the flux barrier portions FBN being one in number for each of the rotor magnetic poles, and each of the flux barrier portions FBN are arranged between the two rotor magnetic poles which are mutually adjacent to each other in the circumferential direction. With this configuration, the mutually-conflicting relationship between a larger torque with a higher power factor and a field weakening characteristic can be overcome. The motor can also be simplified in its configuration.

The object of the present invention is to provide a main-machine motor, which is mounted in an electric vehicle, with i) a larger torque characteristic in lower rotation speeds needed when the vehicle climbs up a sloping road, while the larger torque characteristic is still maintained at a higher power factor, and ii) a field weakening control needed in higher rotation speeds, which can be performed effectively. The present invention provides advantages, one of which is realization of larger torque with a higher power factor, which results from cancelling a motor armature reaction using the magnetic characteristic of permanent magnets; another of which suppresses the permanent magnets from producing field magnetic fluxes excessively, which is resultant from a positionally effective arrangement of the non-magnetic member portions, such as resin materials or empty spaces; and another of which is realization of field weakening control which can be performed efficiently, As a result, the motor can be highly efficient, more compact in size, less in weight, and less in manufacturing cost. Additionally, the higher power factor can be led to reducing a current capacity needed by an inverter for driving the motor, thereby making the inverter more compact in size and lowering manufacturing cost of the inverter.

DETAILED DESCRIPTION OF THE PREFERRED EMBODIMENTS

Figure 1:
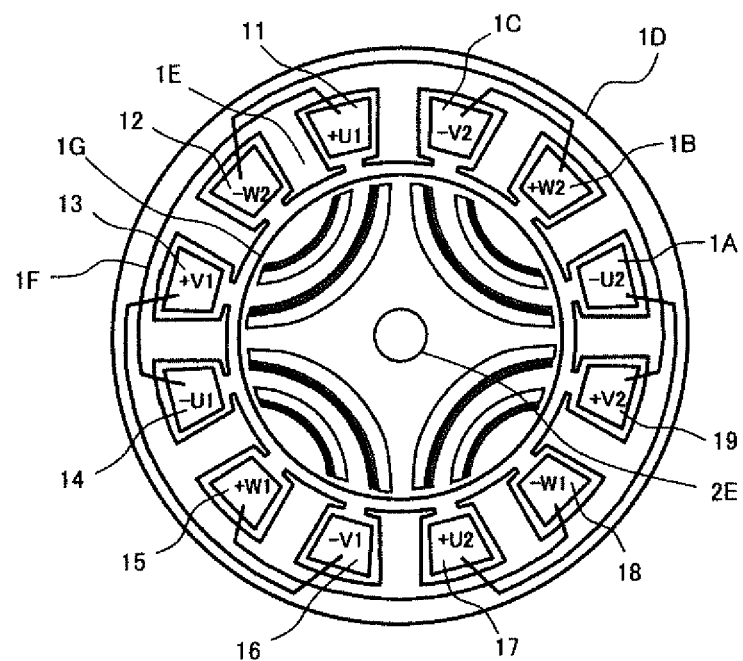
FIG. 1 is a sectional view showing a motor according to an embodiment of the present invention.

FIG. 1 is a sectional view showing an electric motor according to the present invention. The motor is a three-phase alternating current motor with four poles and 12 slots in windings that are wound in a full-pitch winding. This example shows a concentrated winging structure in which the wire for each of the phases is concentrated-wound in respective ones of the slots. A reference number 1D shows a stator, and reference numbers 11 and 14, 17 and 1A are U-phase windings. A U1 winding is wound to pass through designated slots as the windings 11 and 14, while a U2 winding is wound to pass through designated slots as the windings 17 and 1A. A connection wire 1F connects the windings in the slots in a coil end portion and other connection wires also connect the corresponding windings in the slots in the coil end portion. The reference numbers 13 and 16, 19 and 1C are windings for the V-phase, in which a V1 winding is wound to pass through designated slots as the windings 13 and 16, while a V2 winding is wound to pass through designed slots as the windings 19 and 1C. Similarly, the reference numbers 15 and 18, 1B and 12 are windings for the W-phase, in which a W1 winding is wound to pass through designated slots as the windings 15 and 18, while a W2 winding is wound to pass through designed slots as the windings 1B and 12.

Figure 2:
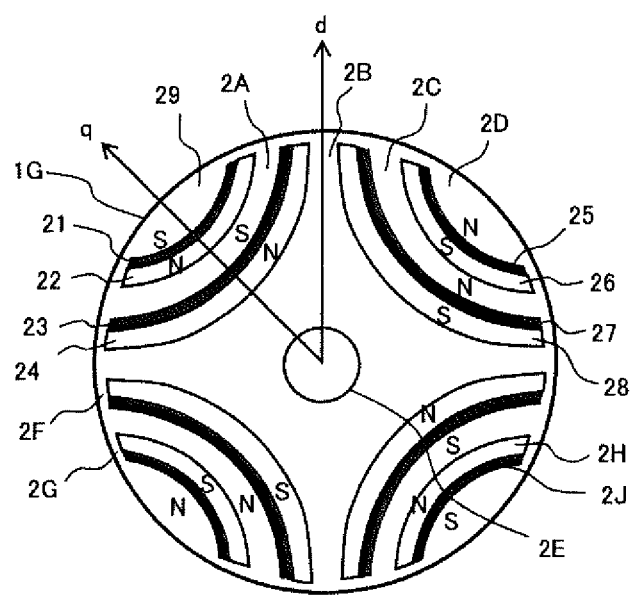
FIG. 2 is a sectional view showing a rotor according to the embodiment of the present invention.

FIG. 2 is an enlarged view of a rotor 1G shown in FIG. 1. The rotor 1G has four poles, in which a d-axis and a q-axis are additionally noted in the figure to show the directions of the rotor magnetic poles. A reference number 21 shows a permanent magnet, to which a non-magnetic member 22 is closely arranged. This arrangement configures a magnetic unit which has a distinctive magnetic characteristic. Similarly to this arrangement, a reference number 22 shows a permanent magnet, to which a non-magnetic member 24 is closely arranged, thereby configuring a magnetic characteristic. A reference number 25 shows a permanent magnet, to which a non-magnetic member 26 is closely arranged, thereby configuring a magnetic characteristic. A reference number 27 shows a permanent magnet, to which a non-magnetic member 28 is closely arranged, thereby configuring a magnetic characteristic. A reference number 2J also shows a permanent magnet, to which a non-magnetic member 2H is closely arranged, thereby configuring a magnetic characteristic.

The permanent magnets 21, 23, 25, 27 and 2J are configured as plate-shaped permanent magnets whose sections are curved along a curve directed from the d-axis positive range to the d-axis negative range. These permanent magnets have polar directions of N- and S-poles, which are shown in the figure.

The non-magnetic members 22, 24, 26, 28 and 2H are composed of, for example, resin attached tightly to a side of each of the permanent magnets, and are configured to be plate-shaped to have a curved section. These non-magnetic members can be provided as empty spaces (or just spaces). The permanent magnet and the non-magnetic member are magnetically and serially linked to each other in each of the mutually juxtaposed magnet and non-magnetic member configuration, so that the order of arrangement of the magnet and non-magnetic member can be reversed with each other, without large changes in the magnetic characteristic. In the example shown in FIG. 2, the non-magnetic members are provided as empty spaces (spaces), and the permanent magnets 21, 23, 25, 27 and 2J are arranged on the outer sides of the non-magnetic members, with consideration for centrifugal forces applied to the permanent magnets.

Reference numbers 29, 2A, 2B, 2C and 2D show field magnetic paths through which field magnetic fluxes pass, in which the field magnetic paths are adjacent to the permanent magnets and the non-magnetic members in each of the mutually juxtaposed magnet and non-magnetic member configurations. The field magnetic flux caused due to a d-axis current passes in the d-axis current in the stator. In the paper of FIG. 2, the upward direction is assigned to the d-axis. A direction shifted 90 degrees in the counterclockwise direction CCW from the d-axis is set to the q-axis. The field magnetic paths are produced by stacking magnetic steel sheets on one another in the rotor axis direction. Alternatively, these paths can also be made of soft magnetic materials such as powder magnetic cores.

The non-magnetic members represent a magnetic state whose specific permeability is low, which is provided by, for example, a resin material or an empty space (or simply a space). Long holes of the magnetic steel sheets, which are used to insert the permanent magnets therein, and further long holes of the non-magnetic members, which are used to arrange the non-magnetic members therein, are referred as slits in the sense of their shapes. The non-magnetic members and the permanent magnets reduce magnetic fluxes caused by factors including armature reaction due to stator currents. Hence, the non-magnetic members and the permanent magnets are referred as flux barriers.

The outer peripheral portion of the rotor shown in FIG. 2 has portions made of the magnetic steel sheets, which are typically indicated by reference numbers 2F and 2G, thereby providing a configuration which resists an centrifugal force. A reference number 2E indicates a rotor shaft. The motor shown in FIGS. 1 and 2 has a characteristic, which will be explained later together with FIG. 6.

Figure 3:
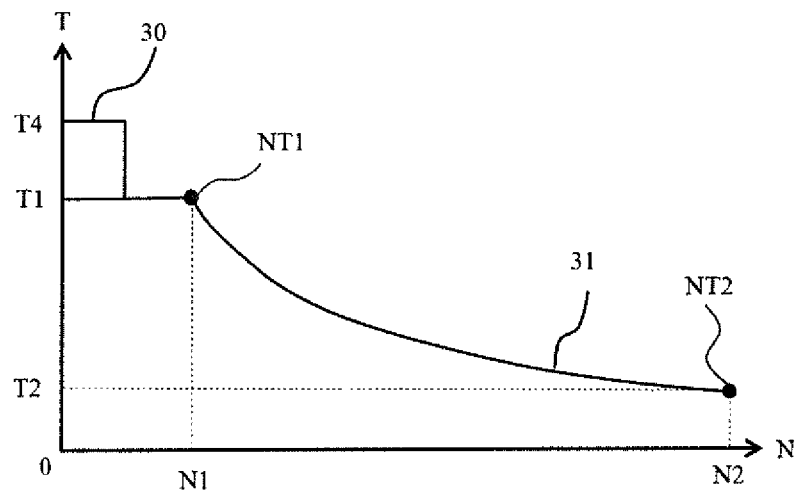
FIG. 3 is a graph exemplifying a rotation speed vs. torque characteristic.

A speed vs. torque characteristic required by motors serving as main machines in electric vehicles or other systems is exemplified in FIG. 3, in which an abscissa axis indicates a rotation speed N and an ordinate axis indicates torque amounts [Nm]. For main-machine motors in such as electric vehicles, a larger amount of torque, T4, which is around an operating point 30 in FIG. 3 is required when the motors are driven to climb a steep slope. Meanwhile, for higher efficiency of the motors, higher power factors are desired under low rotation speeds. An operating point NT1 has a rotation speed N1 which is also referred to as a base rotation speed, in which, in a rotation speed range equal to or less than the base rotation speed N1, a torque amount T1 is required.

In a range from the base rotation speed N1 to a maximum rotation speed N2, there is provided a torque characteristic in which the torque is reduced with an increase in the rotation speed N.

A reference number 31 shows a characteristic which provides a constant or approximately-constant product value between the rotation speed and the torque, which provides a constant output characteristic. In a higher rotation speed range such as a speed range shown by the reference symbol 31, it is necessary to weaken the field magnetic fluxes to the motor such that the motor voltage does not exceed the power voltage of the inverter. In this case, it is also desired that the current used to weaken the field be reduced as much as possible and the copper loss will not be excessive. Hence, the operating point 30 or points closer thereto in FIG. 3 are desired to have larger field magnetic fluxes as much as possible. In contrast, in the higher rotation speed range 31, it is required to make the field magnetic fluxes smaller.

Figure 4:
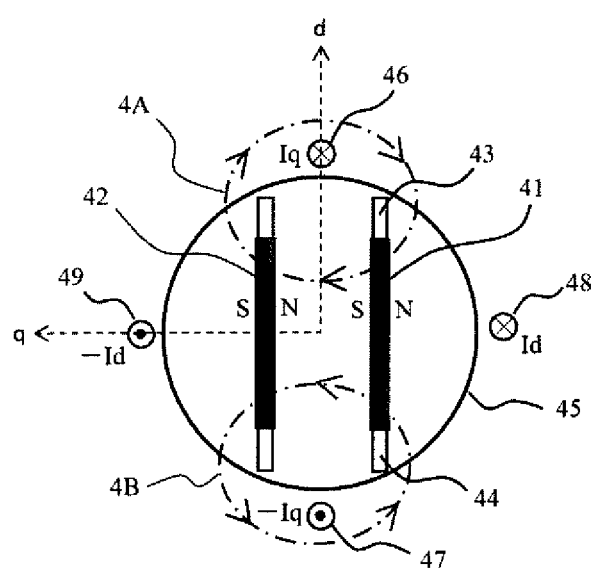
FIG. 4 is a schematic diagram exemplifying a conventional rotor with two poles.

From such a viewpoint, the foregoing problems will now be explained based on FIG. 4 which is equivalently modified into a two-pole motor from the conventional motor shown in FIG. 14. In FIG. 4, a reference number 45 shows the outer surface of a rotor and d- and q-axes are added. Reference numbers 41 and 42 show permanent magnets which have N- and S-polarities as illustrated in the figure, so that the left side in the figure is the S-polarity and the right side in the figure is the N-polarity. Hence, the permanent magnets 41 and 42 produce a magnetic flux component which passes in a direction from the negative range of the q-axis, that is, the left side, to the right side in the figure. Reference numbers 43 and 44 show slits which is provided as empty spaces.

In FIG. 4, reference numbers 48 and 49 show d-axis current components Id, whereby supplying this current in the directions shown therein produces magnetomotive forces in the d-axis direction, thus producing field magnetic fluxes in the d-axis direction. Reference numbers 46 and 47 show q-axis current components in the stator, whereby supplying this current in the directions shown therein produces magnetomotive forces in the negative q-axis direction, thus producing the magnetomotive forces in the q-axis direction, which can be shown by directions shown by reference numbers 4A and 4B. The stator shown in FIG. 4 has the two-pole configuration which is deformed from the stator shown in FIG. 1. In FIG. 4, the d-axis current components Id shown by the reference numbers 48 and 49 the q-axis current components shown by the reference numbers 46 and 47 are shown, but other components such as soft iron portions and slots for windings are omitted from being drawn.

Figure 5:
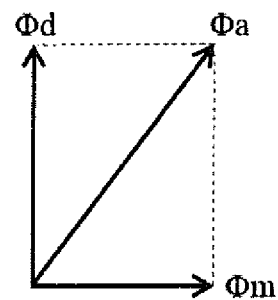
FIG. 5 is an illustration exemplifying a field magnetic flux vector.

FIG. 5 is a vector diagram of magnetic fluxes which explains a field magnetic flux Φa for the motor. A magnetic flux Φm shows a magnetic component [Wb] from the permanent magnets. A magnetic flux Φd shows a d-axis directional magnetic component excited by the d-axis current components Id shown by the reference numbers 48 and 49. The field magnetic flux Φa can be calculated as a vector summation between a magnetic component cm from the permanent magnets and the d-axis directional magnetic component Φd.

Now consider that the conventional motor shown in FIG. 4 is put m into a state where the motor operates on a speed vs. torque range 30 shown in FIG. 3. In this state, the q-axis current components Iq shown by the reference numbers 46 and 47, which are current components for generating the torque, become large amounts. The q-axis current components Iq generate magnetomotive forces shown by chain lines 4A and 4B. These magnetomotive forces 4A and 4B are also referred to as armature reaction forces, whose directions are opposite to the directions of the magnetic fluxes generated from the permanent magnets 41 and 42. Hence, the permanent magnets 41 and 42 weaken the armature reaction caused due to the magnetomotive forces 4A and 4B, so that the magnetic component Φm shown in FIG. 5 is reduced by this weakening.

Additionally, there is also a case where the conventional motor shown in FIG. 4 operates in a higher rotation speed range or thereabout indicated by a reference symbol NT2 in FIG. 3. In such a case, in order to suppress the motor voltage less than a power voltage of the inverter, it is necessary to reduce the magnetic flux component Φm generated by the permanent magnet. For this reason, at high rotation speeds, current to weaken the magnetic strength of the permanent magnets is required to be supplied to the stator of the motor.

Meanwhile, for raising the torque, the magnetic strength of the permanent magnets should be raised, but, for raising the rotation speed, the magnetic strength of the permanent magnets should be lowered, thus being conflicting with each other in their magnetic characteristics. That is, both the magnetic characteristics result in a trade-off relationship, thus it is difficult to make the magnetic characteristic meet both the needs. In addition, the permanent magnets 41 and 42 should not be demagnetized by a large q-axis current component Iq, so that the strength of the permanent magnets 41 and 42 should be maintained, at least, at a level which suffers no demagnetization.

Figure 6:
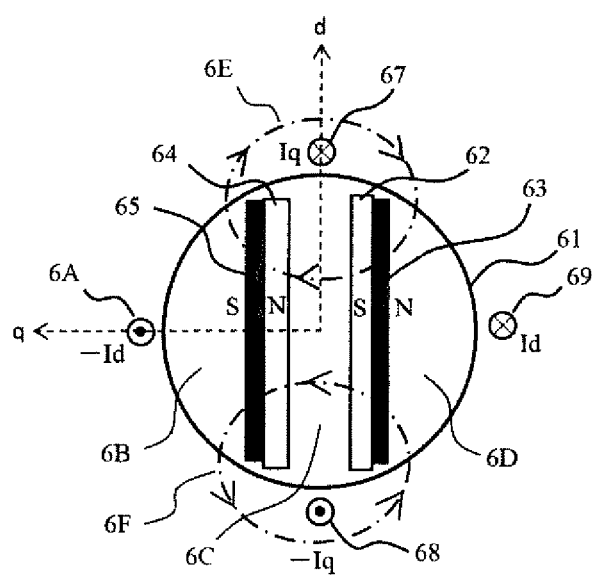
FIG. 6 is a sectional diagram of a two-pole rotor according to an embodiment of the present invention.

FIG. 6 shows a rotor configuration with two poles, which is modified equivalently from the four-pole rotor configuration shown in FIG. 2. Since it will be easier to understand electromagnetic operations of the two-pole motor configuration than a multi-pole motor configuration with four or more poles, electromagnetic operations of the motor according to the present invention will be explained based on the motor configuration shown in FIG. 6. A reference number 61 shows an outer circumferential surface of a rotor. In FIG. 6, d- and q-axes are also denoted. Reference numbers 63 and 65 indicate permanent magnets, whose polarities of N- and S-poles are shown therein. The left side in the figure provides the S-pole, while the right side therein provides the N-pole. The permanent magnets 63 and 65 generate magnetic flux components which pass in a direction from, the q-axis negative range, that is, the left side, to the right side in the drawing. Reference numbers 62 and 64 show non-magnetic members, and are made of non-magnetic material, such as a resin material or an empty space, having higher electrical resistance.

Reference numbers 69 and 6A indicate d-axis current components Id flowing in the stator. When currents are made to flow in the directions shown by the current symbols, a magnetomotive force is generated in the d-axis direction, while field magnetic fluxes are generated, respectively, along the d-axis directions in magnetic paths 6B, 6C and 6D made of soft magnetic member.

Reference numbers 67 and 68 indicate q-axis current components Iq flowing in the stator. When the currents are made to pass in the directions shown by the current symbols, a magnetomotive force is generated in the q-axis negative direction, whereby magnetomotive forces are generate in the q-axis direction, that is, in directions of magnetic paths 6E and 6F shown by chain lines. The current directions shown by reference numbers 67 and 69 pass the drawing paper from the front face to the rear face, whilst the current directions shown by reference numbers 68 and 6A pass the drawing paper from the rear face to the front face.

In addition, FIG. 1 shows a lateral sectional view of the motor, in which slots with three-phase winding arranged therein are shown. This motor has the three phases, such as U-, V-, and W-phases, and four poles. A four-pole stator coordinate is exemplified in the figure. In contrast, the stator shown in FIG. 6 is presented using a rotating system of coordinates composed of the d- and q-axes, which is modified into a two-pole configuration from the four-pole stator shown in FIG. 1. In FIG. 6, the d- and q-axes are added. Moreover, in FIG. 6, only the q-axis current components Id shown by the symbols 69 and 6A and the q-axis current components Iq shown by the symbols 67 and 68 are shown, while other components such as soft iron portions and slots for windings are omitted from being drawn.

Figure 7:
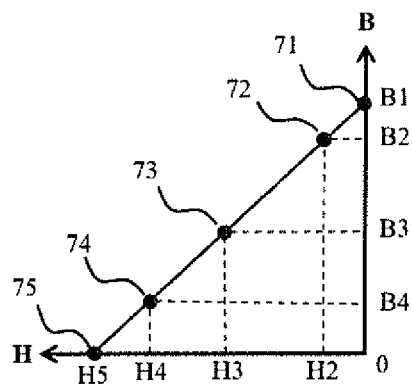
FIG. 7 is a graph exemplifying a magnetic characteristic of a permanent magnet.

In order to explain operations of the rotor configuration shown in FIG. 6, a magnetic characteristic of a permanent magnet PM1 is exemplified in FIG. 7. In FIG. 7, the ordinate axis indicates magnetic flux densities [T] and the abscissa axis indicates magnetic field strengths [A/T]. The permanent magnet PM1 has an operating point 71 which is defined by a residual magnetic flux density B1 and a magnetic field strength of 0. In contrast, an operating point 75 in FIG. 7 is defined by a magnetic field strength H5 and a magnetic coercive force of the permanent magnet PM1.

The conventional motor shown in FIG. 4 is provided with magnetic steel sheets which are made of soft iron and which function as a magnetic circuit for the permanent magnets 41 and 42. An air gap AGP is formed between the stator and the rotor. Hence, magnetic resistance is relatively smaller, so that both a magnetic density B2 and a magnetic field strength H2 which are relatively larger are provided with current which is not supplied to the motor. For instance, in the rotation speed v.s. torque characteristic shown in FIG. 3, it can be assumed that the rotor rotates at N2 or thereabouts which is higher and a loaded torque to the rotor is smaller and close to zero. In this assumed situation, if the motor current is close to zero, a field flux component φm becomes larger because the field flux component Om is proportional to B2 shown in FIG. 7. Hence, by setting the d-axis currents 4M and 49 in FIG. 5 to smaller amounts, a field flux component φd can be made close to zero. However, in contrast to this, since the field flux component φm becomes larger, an excessively lager voltage is induced in each of the phase windings, which needs to supply, as currents to weaken the field flux components φm and φa, q-axis currents Iq to the currents (coils) 46 and 47 shown in FIG. 4. Supplying these weakened field currents will cause, however, a decrease of efficiency of the motor in its a higher-rotation and lighter-load operation range. That is, a magnetic flux density B2 provided at the foregoing operating point 72 will produce a flux component which is too large as the field flux component φm from the permeant magnets.

For reducing the field flux component φm, it is possible, by way of example, to take a countermeasure which reduces the thicknesses of the permanent magnets 41 and 42. This thickness reduction allows the induced voltage across each phase winding to be reduced when a load to the motor is lighter, which is thus able to overcome problems caused by the excessively induced voltage in case where the motor current is lower. Meanwhile, however, for larger amounts of torque to the motor, larger amounts of current should be generated, whereby magnetomotive forces 4A and 4B illustrated in FIG. 4 become larger. This results in a problem that copper loss increases due to a decrease in the power factor which results from changes of the field magnetic fluxes φa. There is also caused a problem that the permanent magnets 41 and 42 are obliged to be demagnetized when larger amounts of current are required.

Figure 14:
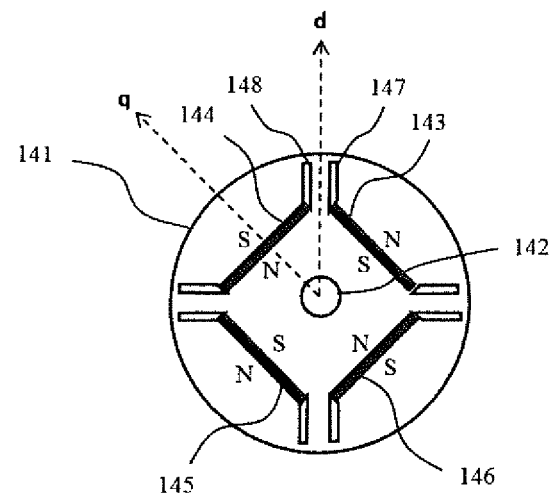
FIG. 14 is a sectional view exemplifying a conventional motor.
Figure 15:
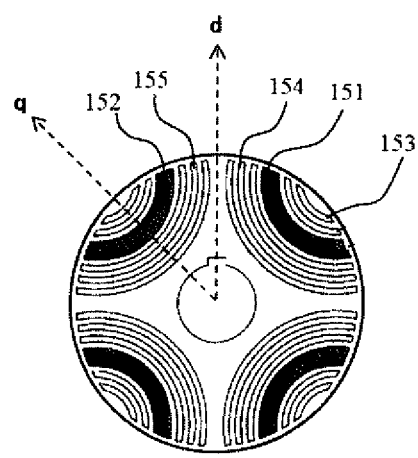
FIG. 15 is a sectional view exemplifying another conventional motor.

In a conventional magnet embedded type of synchronous motors shown in FIGS. 14 and 4, however, the foregoing problems are often not so much noticeable in a torque range approximately extending from lower amounts of torque to 200% of a continuous rating torque. For this reason, there are no particular problems for applications directed to such a torque range, so that such synchronous motors are used for such applications.

Meanwhile, in main-machine motors mounted in electric vehicles or hybrid vehicles, larger amounts of torque such as 300% or 400% of a continuous rating torque are required in a lower rotation speed range, which is desired for example when the vehicles climb up a steep sloping road. In such a lower rotation speed range, the conventional motor may reduce the power factor down to 0.6 or thereabouts, thus requiring 1.6667 (1/0.6) times the current compared to a case where the power factor is 1.0, thus increasing the copper loss up to 2.7778 times due to the fact that the copper loss is proportional to the current. In addition to this, there is still left an issue that current for weakening the field should be supplied in higher rotation speeds. Due to such various factors, it is inevitable that the motor size is made larger and the current capacity and structural size of the invertor increase. It is therefore not easy to balance the larger torque characteristic in the lower rotation speeds and the field weakening characteristic in the higher rotation speeds.

In the motor according to the present invention, there are provided a permanent magnet 63 and a non-magnetic member 62, which are arranged to come into contact to each other and magnetically in series. This contact arrangement is also performed with a permanent magnet 65 and a non-magnetic member 64. Hence, when the stator current is not supplied, a density of magnetic fluxes directing from the left to the right in FIG. 6 can be suppressed to a lower amount. Incidentally, the directions of magnetic fluxes from the permanent magnets are opposite to the directions of the magnetic flux paths 6E and 6F indicating the directions of magnetomotive forces based on the q-axis currents 67 and 68, respectively. Magnetic paths 6B, 6C and 6D made of soft magnetic material are present in directions perpendicular to magnetic flux directions from the permanent magnets 63 and 65. The d-axis magnetic fluxes, shown in FIG. 5, can be generated easily by the d-axis currents 69 and 6A, whereby the amount of the field magnetic flux φa can be made larger, which is led to generating a larger amount of torque.

The amounts of the magnetic flux densities in FIG. 6 will now be outlined, in a comparative manner with the conventional motor shown in FIG. 4, on the assumption that an air gap between the stator and the rotor is 0.5 mm, a thickness to of each of the non-magnetic members 62 and 64 is 2 mm, and a magnetic resistance value of other soft magnetic materials is 0. Additionally, it is assumed that the permanent magnets 63 and 65 each have a thickness tm and a length Lm. For the sake of simplifying a calculation model, an assumption is made such that the length Lm of each of the permanent magnets and a circumferential length of an air gap portion, through which the magnetic fluxes from the permanent magnet pass, are equal to each other. Also, in the configuration of FIG. 4, it is also assumed that the air gap is also 0.5 mm in width and the thickness tm and length of the respective permanent magnets 41, 42, are same as those of the permanent magnets 63, 65 in FIG. 6.

In the magnetic flux path 6E in the motor shown in FIG. 6, a total length of both the air gap and widths of the non-magnetic members in the magnetic flux direction is approx. 5 mm (=0.5+0.5+2+2). However, since a corresponding length of the air gap in the motor magnetic flux 4A in FIG. 4 is 1 mm (=0.5+0.5), the magnetic resistance in FIG. 6 is approximately five times larger than that shown in FIG. 4. In the magnetic characteristic of the permanent magnet PM1 shown in FIG. 7, the motor of FIG. 4 has an operating point 72, while the motor of FIG. 6 has an operating point 73 indicating a magnetic flux density B3 and a magnetic field strength H3.

Based on a relationship of "magnetic field strength of magnet"×"thickness of magnet"="magnetic field strength of non-magnetic member portion"×"magnetic path length of non-magnetic member portion", the following formulae are provided, in which an assumption is made such that the d-axis current Id shown by the reference numbers 69 and 6A and the q-axis current Iq shown by the reference numbers 67 and 68 are zero:

$$H2 \times tm \times 2 = HX \times 0.001 \quad (1)$$

$$H3 \times tm \times 2 = HY \times 0.005 \quad (2)$$

$$B2 = \mu \times HX \quad (3)$$

$$B3 = \mu \times HY \quad (4)$$

, wherein a reference symbol HX shows a magnetic field strength in the air gap of the conventional motor shown in FIG. 4 and a reference symbol HY shows a magnetic field strength in the air gap of the motor shown in FIG. 6 which is according to the present invention. A reference symbol μ indicates permeability. From the formulae (1) to (4), the following formula is provided:

$$H3/H2 = HY/HX \times 5 = B3/B2 \times 5 \quad (5).$$

Although being dependent on the permanent magnet characteristic, in a case where the magnetic flux density B2 is ½ of B2, the magnetic field strength H3 is approximately 2.5 times larger than H2. When the length of the non-magnetic member portion is changed from 1 mm to 5 mm which is five times larger, the magnetic flux density is not changed to ⅕ times. As exemplified above, the motor illustrated in FIG. 6 can provide a magnetic flux density which is reduced from that provided by the conventional motor of FIG. 4, under the assumption the current is zero. In the permanent magnet characteristic in FIG. 7, the operating point is changed from the point 72 to the point 73.

An example where a larger amount of current is supplied to the motor of FIG. 6 will now be described.

When the q-axis current component Iq shown by the reference numbers 67 and 68 is zero, the operating point is located at the pint 73 in FIG. 7, which provides a magnetic field strength H3. Hence, a magnetomotive force generated by the two permanent magnets is expressed as "2×H3×tm", which is a product of the magnetomotive force of the permanent magnets at the operating point and the magnet thickness tm. This generated magnetomotive force is used for magnetically exciting the two air-gap points and the non-magnetic members 62 and 64. Accordingly, the magnetic flux density B3 can be approximated from the formula (2), which is as follows:

$$B3 = \mu \times HY = \mu \times (H3 \times tm \times 2)/0.005 \qquad (6)$$

In this case, the magnetomotive force H3 has a unit defined as [A/T], the magnetic flux density B3 has a unit of [T], µ is permeability, and the lengths of the air-gap points and the non-magnetic members have a unit of [m].

When the q-axis current component Iq which is shown by the reference numbers 67 and 68 has a larger amount Iqz, a magnetomotive force is generated to pass the permanent magnets 64 and 65 in an arrow direction shown by the reference number 6E, so that the operating point is moved from the point 73 to a point 74 in FIG. 7. In response to this, the magnetic flux density at the permanent magnets 63 and 65 changes from the point B3 to a point B4, this increasing the magnetic field strength from the point H3 to a point H4. In this case, the magnetomotive force is consumed for magnetically exciting the two air-gap points and the non-magnetic member 62 and 64, and reduces by an amount dependent on a reduction in the magnetic flux density from B3 to B4. Specifically, by this consumption, the magnetomotive force reduces from "H3×tm×2" to "(H3×tm×2)×B4/B3". Of a magnetomotive force generated by the permanent magnets 63 and 65, a magnetomotive force HT4 which cancels the q-axis current component Iq is expressed by the following formula:

$$HT4 = (H4 \times tm \times 2) - (H3 \times tm \times 2) \times B4/B3 \qquad (7)$$

If the permanent magnets 63 and 65 have a magnetic characteristic in which the operating point 75 is not demagnetized down to a magnetic flux density 0 but the motor needs the characteristic at the operation point 75, a magnetomotive force HT5 which allows the permanent magnets 63 and 65 to cancel the foregoing q-axis current component Iq can be expressed as follows:

$$HT5 = (H5 \times tm \times 2) - (H3 \times tm \times 2) \times 0/B3 \qquad (8)$$

$$= (H5 \times tm \times 2) \qquad (9)$$

The foregoing formula (9) shows that all of magnetic coercive forces H5 of the permanent magnets can be used to cancel a magnetomotive force which is an armature reaction caused by the q-axis current component Iq shown by the reference numbers 67 and 68. Such magnetomotive force of the permanent magnets is not affected by the thicknesses tn of the non-magnetic members 62 and 64. That is, it is shown that even if thicknesses tn of the non-magnetic members 62 and 64 are larger, most of the magnetic coercive forces of the permanent magnets 63 and 65 can be used to cancel the armature reaction. Accordingly, the motor can be designed such that the thicknesses tm of the permanent magnets are decided depending on a maximum magnetomotive force generated by the q-axis current component Iq shown by the reference numbers 67 and 68, and the thicknesses to of the non-magnetic members 62 and 64 are set so as to meet a weakened field of the motor in a higher rotation speed range.

Incidentally, for generating a larger amount of torque with a higher power factor, an operating point 74 is desired instead of the operating point 75 in the B-H characteristic shown in FIG. 7.

Another example will now be explained in which, as shown by a driving range 30 in FIG. 3, a larger amount of torque is required in a lower rotation speed range.

In the motor shown in FIG. 6, a d-axis field magnetic flux φd is generated by supplying a d-axis current component Id shown by the reference numbers 69 and 6A, the φd is subjected to a vector synthesis with a magnet magnetic flux φm so that a field magnetic flux φa is generated, while a larger amount of current is given to the q-axis current component Iq, shown by the reference numbers 67 and 68, in order to obtain a larger amount of torque. A cross product between the field magnetic flux φa and a stator current Ia provides torque, in which the stator current Ia is expressed as a vector sum between the d-axis current component Id and the q-axis current component Id. In addition, as described, the permanent magnets 63 and 65 can be set to have a thickness which resists, i.e., cancels a magnetomotive force generated by the stator current Ia. It is therefore possible to prevent the torque from lowering due to the armature reaction, resulting in improvement of the power factor.

Another example will now be explained in which, as shown by a driving range 31 in FIG. 3, the motor is driven in a higher rotation speed range. In the higher rotation speed range, it is necessary to reduce the field magnetic flux φa so as to prevent the motor voltage from exceeding the power voltage of the inverter. For instance, when constant output control is carried out in the driving range 31 and a maximum rotation speed N2 is four times larger than a basic rotation speed N1, a field magnetic flux φa2 at an operating point NT2 should have a magnitude, which is ¼ times smaller than that of a field magnetic flux φa1 at the operating point NT1.

As a result, it is necessary to give larger values to the thicknesses of the non-magnetic members 62 and 64 and give smaller values to the field magnetic flux components φm of the permanent magnets. In the higher rotation speed range, driving control can be performed by setting the d-axis current component Id and the q-axis current component Iq depending on a commanded rotation speed and a commanded torque amount. In this way, the motors shown in FIGS. 2 and 6 can balance, at higher levels, a larger torque characteristic in the lower rotation speed range and a field weakened characteristic in the higher rotation speed range.

The thicknesses to of the non-magnetic members 62 and 64 will now be explained.

A sum of thicknesses of a plurality of non-magnetic members in the magnetic flux flow direction is concerned with a size of the constant output range, a maximum torque, a motor size, and other factors. At least, a sum of the thicknesses of the plurality of non-magnetic members which are arranged magnetically in series is set to an amount larger than an air gap width Lg between the stator and the rotor.

When a motor has an air gap width which changes in the circumferential direction, the foregoing air gap width Lg is assigned to a minimum air gap width which is provided at a certain position a circumferential direction. In the main-machine motors for electric vehicles, the motor capacity is from several kilowatts to several hundred kilowatts and the air gap width is 0.3 mm to 1.5 mm or thereabouts. In addition, a sum of the thicknesses of the plurality of non-magnetic members arranged magnetically in series is equal to or greater than ¼ of a sum of the thicknesses of the plurality of permanent magnets arranged magnetically in series. These numeral values about the thicknesses result from trial-calculating characteristics of the motor according to the present invention based on various motor parameters and estimating the characteristics in terms of how much of effective advantages are gained.

The configurations and advantageous effects of the motor according to the present invention can be summarized as follows.

Assigning adequate values to the thicknesses tm of the permanent magnets 63 and 65 allows necessary magnetic flux densities to be set. Concurrently, assigning adequate values to the thicknesses to of the non-magnetic members 62 and 64 tightly contacted to the permanent magnets respectively prevents the permanent magnets from generating an excessive magnetic flux density. In addition, the thicknesses tm can be set so that the permanent magnets 63 and 65 is not demagnetized, which is due to an armature reaction caused by supply the stator current. The magnetic paths 6B, 6C and 6D in the soft magnetic members are produced in directions perpendicular to the magnetic flux directions of the permanent magnets in terms of the electrical angles, whereby the d-axis current can easily generate the field magnetic flux component φd in the d-axis direction. This makes it possible to change the field magnetic flux φa in an easier manner, resulting in efficiently providing the motor with a larger amount of torque and an effectively weakened field.

Figure 8:
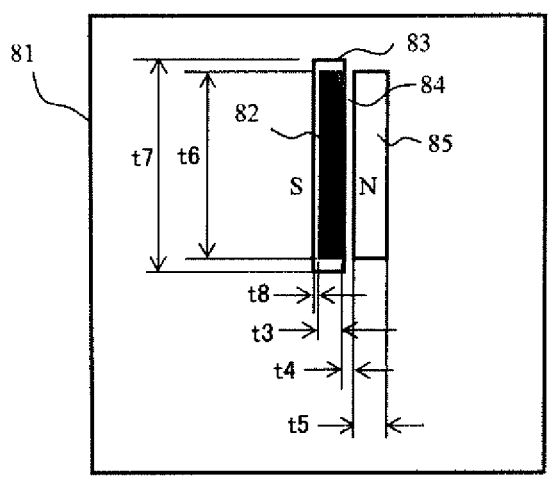
FIG. 8 is a sectional view exemplifying the shapes of a permanent magnet and a non-magnetic member.

The positional relationship and the shapes of the permanent magnets and non-magnetic members shown in FIGS. 2 and 6 are exemplified using an illustration of FIG. 8.

A reference number 81 shows a part of each of the magnetic steel sheets composing the rotor body, in which the magnetic steel sheets are stacked on one another in a direction from the back to the front of the drawing. A reference number 83 shows a long-hole slit which is an empty space, in which the assigned permanent magnet is fixedly arranged. The slit 83 is also in charge of increasing magnetic resistance in a portion including the slit. A reference number 82 shows a permanent magnet which is inserted in the stacked direction of the magnetic steel sheets 81.

The permanent magnet 82 is magnetized in a direction as shown in the symbols N and S. That is, the right side of the magnet is an N pole and the left side thereof is an S pole in the drawing.

The permanent magnet 82 has a thickness t3 and a length t6, which dimensions are set based on how much the armature reaction is caused in the motor and electromagnetic influence depending on degrees of the armature reaction. The slit has a length t7 which is also set with consideration of such electromagnetic influence Within the slit 83, there is an empty space t8 between the permanent magnet 82 and one of the slit walls. This empty space t8 is necessary to insert the permanent magnet 82 for the assembly, and is as small as 0.2 mm for instance.

A reference number 85 shows a non-magnetic member composed of an empty space or a resin material and configured to have a thickness t5 which is also defined with consideration of the electromagnetic influence. By the way, if the non-magnetic member 85 is composed of an empty space, the non-magnetic member 85 is also called a slit.

There is formed a magnetic steel sheet portion 84 between the permanent magnet 82 and the non-magnetic member 85. The magnetic steel sheet portion 84 is for fixing both the permanent magnet 82 and the non-magnetic member 85. This portion 84 has a width t4 which is very small in size, which is at a level which makes it possible that the permanent magnet generates magnetic flux but part of which leaks through the magnetic steel sheet portion 84 toward upper and lower portions of the portion 84, but a leaked amount of the flux is neglected. For example, the width t4 is equal to or less than ⅕ of the length t6. In cases where the width of the magnetic steel sheet portion 84 is small, it can be regarded that the permanent magnet 82 and the non-magnetic member 85 are substantially closely contacted to each other, so that such a substantial mutual contacted configuration can also be regarded as being included in the scope of the present invention. From this point of view, the configurations shown in FIGS. 2 and 6 fall into a case where the width t4 of the magnetic steel sheet portion 84 is set to zero.

Figure 9:
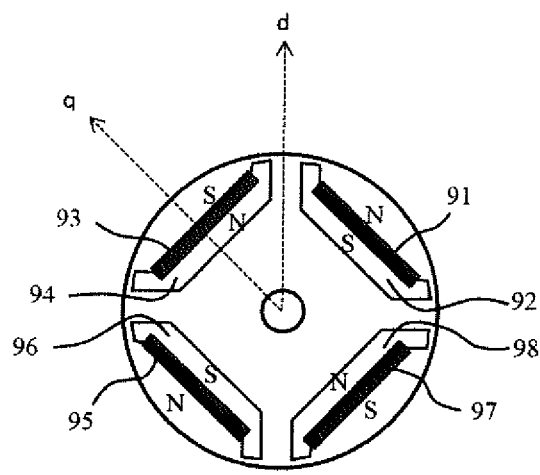
FIG. 9 is a sectional view exemplifying a four-pole rotor according to the present invention.

A motor having a rotor shown in FIG. 9 has the number of four magnets, which is half of that of the rotor shown in FIG. 2. The shape of each of the magnets is flat. Reference numbers 91, 93, 95 and 97 indicate permanent magnets, while reference numbers 92, 94, 96 and 98 indicate non-magnetic members. The flat permanent magnets can be produced in an easier and higher performance, which is also able to simplify the rotor configuration, which can thus be led to a lower production cost of the rotor. Like the configuration shown in FIG. 2, the number of magnets and non-magnetic members can be doubled. Alternatively, the number of magnets and non-magnetic members can be tripled. As another alternative, various shapes of the permanent magnet and the non-magnetic member can be used alone or used in combination.

Figure 10:
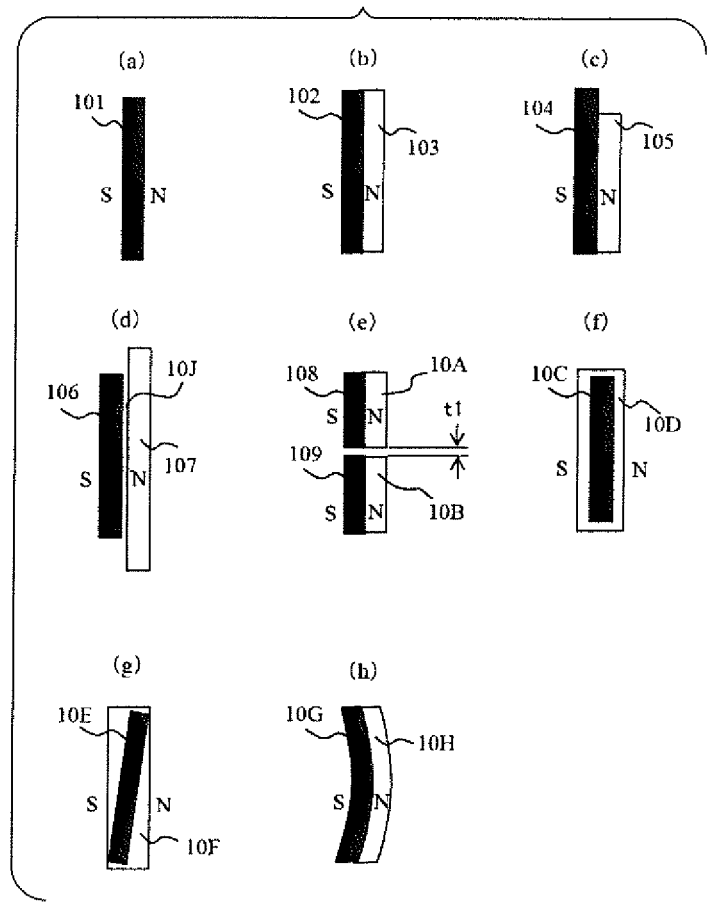
FIG. 10 is a sectional view exemplifying the shapes of permanent magnets and non-magnetic members.

FIG. 10 shows various types of section shapes of the permanent magnet and the non-magnetic member, which are modified examples thereof. The rotor shaft direction is set as a direction passing the front/rear directions of. Each of the modifications can be applied to the motor of the present invention, which is shown in FIGS. 2, 6, 9, 11, 12, 13 and not-shown similar structures. Incidentally, the magnetic steel sheet corresponding to that 81 in FIG. 8 is omitted from being drawn in FIG. 10. FIG. 10 provides a part (a), in which there is provided a permanent magnet 101 which has N and S poles on the right and left sides in the drawing. A rotor shaft passes along a direction passing the drawing it its front/rear directions. The permanent magnet 101 is shaped into a flat board. This flat board shape is true of other modifications in FIG. 10.

A part (b) of FIG. 10 shows a configuration in which a permanent magnet 102 and a non-magnetic member 103 are contacted substantially tightly and in parallel to each other. Similarly to the foregoing, there is formed a thin magnetic steel sheet portion between the permanent magnet 102 and the non-magnetic member 103. Such a portion is effective for fixing both the permanent magnet 102 and the non-magnetic member 103. A part (c) of FIG. 10 shows an example in which a permanent magnet 104 is shorter than a non-magnetic member 105.

A part (d) of FIG. 10 provides an example, in which a non-magnetic member 107 is longer than a permanent magnet 106. A magnet steel sheet portion 10J, which is thin, is provided between the permanent magnet 106 and the non-magnetic member 107. In an example shown in a part (e) of FIG. 10, a permanent magnet is configured to be divided into or arranged as two permanent magnets 108 and 109, a non-magnetic member is also configured to be divided into or arranged as two non-magnetic members 10A and 10B, and there is formed a magnetic steel sheet portion of a length t1 between two pairs of non-magnetic members and permanent magnets. This magnetic steel sheet portion, whose length is t1, gives respective portions of the rotor larger strength resisting a centrifugal force generated in the rotor, however this portion suffers flux leakage which is not good in an electromagnetic sense. This portion having the length t1 is also called a connecting part, a rib or a bridge and frequently employed in permanent magnet embedded motors. It is requested that this connecting part have a strength which depends on motor sizes, weights of the permanent magnets, rotation speeds desired to the motor. Hence, designing this this connecting portion is one of the significant factors in designing the strength of the rotor of the motor according to the present invention.

A part (f) of FIG. 10 provides an example in which a permanent magnet 10C is obliquely arranged within a slit 10D. In the examples shown in parts (f) and (g) of FIG. 10, non-magnetic member portions are present on both right and left sides of a permanent magnet, so that this configuration provides an electromagnetic characteristic similar to that of the part (b) of FIG. 10. From a structural point of view, it can be referred that, for example, a magnet is inserted into the slit and the slit is filled with resin. Alternatively, a magnet covered by coated resin is inserted into the slit. A part (h) of FIG. 10 provides a curved arrangement in which both a permanent magnet 10G and a non-magnetic member 10H are curved. Of course, the permanent magnet and the non-magnetic member may be bent. As can be understood from the foregoing examples, the electric motor according to the present invention can provide a wide variety of modified shapes of both the permanent magnet and the non-magnetic member.

An embodiment concerning claim 2 will now be explained.

Figure 11A:
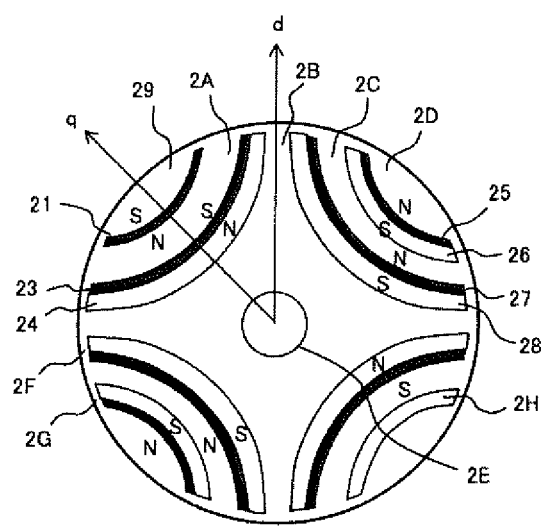
FIGS. 11A and 11B are sectional views exemplifying a four-pole rotor according to the present invention.
Figure 11B:
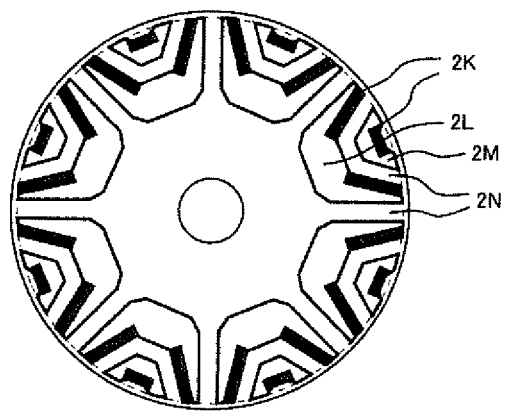

FIG. 11A shows a partial modification of the rotor configuration according to the present invention, in which the permanent magnet 2J and the non-magnetic member 22 shown in FIG. 2 are removed. In this way, the magnetic poles of the rotor can be removed or added partially. In addition, in order to reduce torque ripples, the magnetic poles may be configured asymmetrically. FIG. 11B provides a modification in which the number of magnetic poles is increased to 8 poles from 4 poles shown in FIG. 2 and the configuration elements shown in FIG. 10 is also applied to this modified configuration. A reference number 2K shows a permanent magnet, reference numbers 2L and 2M show non-magnetic members made of for example an airspace, and a reference number 2N shows magnetic paths. Since the airspace 2L is wider, this makes leakage flux smaller. A permanent magnet is omitted from being drawn at a point close to the airspace 2L.

An embodiment according to claim 3 of the present invention will now be described.

Figure 12:
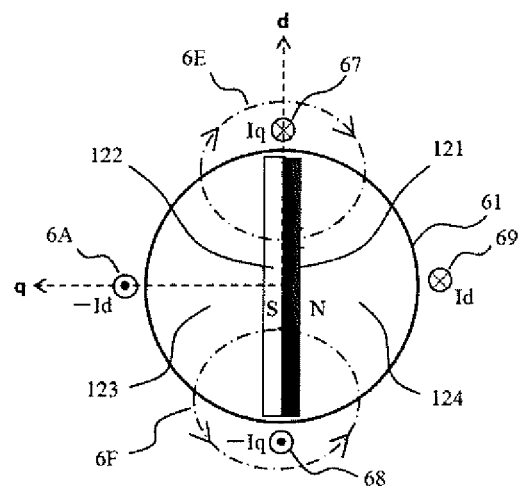
FIG. 12 is a sectional view pictorially exemplifying a two-pole rotor according the present invention.

An electric motor shown in FIG. 12 is provided with a configuration simplified from that of FIG. 6. Specifically, in the motor of FIG. 12, the number of permanent magnets and non-magnetic members, which compose the two-pole motor configuration in FIG. 6, is reduced from two to one, thereby still providing the two-pole configuration but simplifying the configuration. In FIG. 12, a reference number 121 shows a permanent magnet and a reference number 122 shows a non-magnetic member. In addition, reference numbers 123 and 124 indicate portions functioning as magnetic paths composed of a soft magnetic material or others. The paths guide the fluxes in almost vertical directions in the drawing of FIG. 12.

Figure 13:
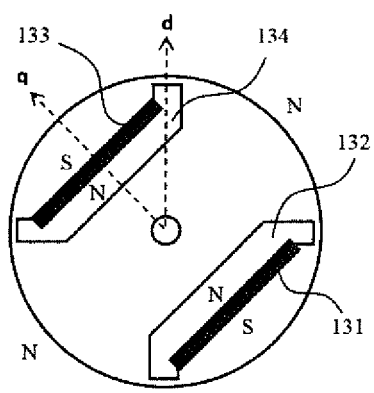
FIG. 13 is a sectional view pictorially exemplifying a four-pole rotor according the present invention.

FIG. 13 exemplifies a four-pole electric motor which is developed in the pole number from the 2-pole electric motor shown in FIG. 12. Reference numbers 131 and 133 indicate permanent magnets, while reference numbers 132 and 134 indicate non-magnetic members. When the motor current is zero, N-pole magnetic fluxes are generated on the upper right and lower left sides in the drawing of FIG. 13, while S-pole magnetic fluxes are generated on the upper left and lower right sides therein, thereby simplifying the four-pole rotor and reducing the number of parts for a reduced manufacturing cost.

An alternative configuration can be provided by adding, the configurations shown in FIGS. 12 and 13, the permanent magnet 21 and the slit 2H which are taught in FIG. 11A. In this configuration, from a theoretical point of view, the flux barrier provided by a combination of the permanent magnet and the non-magnetic member is effective due to the fact that discreteness of the flux can be made smaller with an increase in the number of layers of such members, while such a flux barrier makes the motor complex in its structure.

As described, the present invention has been described with various embodiments, but is not limited to the configurations described in the embodiments. Other various changes, applications and combinations of such modifications can be possible. For example, the number of electric phases of the electric motor can be modified to have 5 phases or 7 phases, and the number of magnetic poles can also be selectable. The motor is able to have a stator winding wound with a concentrated winging technique, a distributed winding technique, a short pitch winding technique, or a toroidal winding technique. The electric motor can be configured as an outer rotor type of motor, an axial-gap type of motor, or a liner motor. A plurality of motor components can be arranged in the radial direction or a rotor axial direction, so that a complex motor can be provided. Other types of motor components may also be combined with the foregoing embodiments.

In addition, in the present invention, a field winding described in JP-A-2015-65803 may be added to the exemplified rotor and/or a mechanism to supply power for the field winding from a stator side to the rotor may also be added to the exemplified rotor. Power supply to the field winding of the rotor can be performed by various techniques, such as wireless power supply from a stator winding to a winding wound in the rotor core; power supply using an added rotary transformer; or power supply through a brush and slipring mechanism.

The soft magnetic material used by the motor includes various types of materials such as power magnetic core, amorphous metal core, or Permendur. A wide variety of permanent magnets may also be used, which enables magnetic characteristics of the magnets to be changed in conformity of usage. Magnet characteristics can be changed based on current supplied to the motor or using a dedicated apparatus.

The fact that inductive voltage across the windings and magnetic characteristics of the windings are changed depending on the rotor rotation can be used as a sensor-less position detection technique. Hence, this detection technique is also application to the motor of the present invention.

Further, for reducing ripples in the motor torque, vibration, and noise, the motor of the present invention can be modified such that part of the rotor magnetic poles is moved in the circumferential direction, specifically, an electrical angle position of a permanent magnet closer to the rotor outer circumference is moved in the circumferential direction.

Still further, since the main-machine motors for vehicles are mainly used as a drive for forward travel, the motor structure according to the present invention can be configured to give priority to one-way torque corresponding to the forward travel. Various other techniques developed from the foregoing applications or modifications can be included into the gist of the present invention.

PARTIAL REFERENCE SINGS LIST 1G rotor
21, 23, 25, 27, 2J permanent magnet
22, 24, 26, 28, 2H non-magnetic member
29, 2A, 2B, 2C, 2D magnetic path
2E rotor shaft
2F, 2G rotor peripheral portion

What is claimed is:

1. A motor provided with a permanent magnet, comprising:
   a stator;
   a rotor arranged to be opposed to the stator via an air gap, the rotor having magnetic poles; and
   a magnetic unit arranged between mutually-adjacent two of the rotor magnetic poles in a circumferential direction of the rotor;
   wherein the magnetic unit comprises a permanent magnet and a non-magnetic member arranged, as a paired flux barrier element, in a path of magnetic fluxes in the rotor,
   the permanent magnet having a curved or plate-shaped section provided when being viewed in an axial direction of the rotor, the permanent magnet being arranged in a long-hole shaped slit formed between the two of the rotor magnetic poles in the path of magnetic fluxes in the rotor and formed to have a curved or plate-shaped section when viewed in the axial direction, the path of the magnetic fluxes circulating through both the rotor and stator; and
   the non-magnetic member having a curved or plate-shaped section provided when being viewed in the axial direction, the non-magnetic member being provided in the path of magnetic fluxes in the rotor;
   wherein the permanent magnet and the non-magnetic member of the magnetic unit are arranged to come into contact to each other in the path of the magnetic fluxes in the rotor,
   the non-magnetic members of all the magnetic units magnetically serially connected in the path of magnetic fluxes have a sum of thicknesses which is equal to or larger than $1/4$ of a sum of thicknesses of the permanent magnets of all the magnetic units.

2. The motor according to claim 1, comprising:
   a further permanent magnet which is magnetically serially connected to the magnetic unit in the path of magnetic fluxes in the two of the rotor magnetic poles in the rotor.

3. The motor according to claim 1, wherein the rotor comprises
   a further non-magnetic member which is magnetically serially connected to the magnetic unit in the path of magnetic fluxes in the two of the rotor magnetic poles in the rotor.

4. The motor according to claim 1, wherein, in the two of the rotor magnetic poles of the rotor, when the motor has rotor magnetic poles whose number is four or more, the magnetic unit is half the number of the rotor magnetic poles.

5. The motor according to claim 1, wherein the permanent magnet of the magnetic unit is arranged radially outside the non-magnetic member in the path of magnetic fluxes in the rotor.

6. The motor according to claim 1, wherein the magnetic unit includes a thin magnetic steel portion positioned between the permanent magnet and the non-magnetic member, the thin magnetic steel portion meeting a relationship wherein $t4/t6$ is equal to or smaller than $1/5$, where $t6$ denotes a length of a section of the permanent magnet when being viewed in the axial direction and $t4$ denotes a width of the thin magnetic steel portion when being viewed in the axial direction.

7. The motor according to claim 1, wherein the rotor has a rib connecting both portions of the rotor, the both portions being located on sides of the magnetic unit in the path of magnetic fluxes, the rib crossing through the magnetic unit.

* * * * *